(12) United States Patent
Welschoff

(10) Patent No.: US 11,987,131 B2
(45) Date of Patent: May 21, 2024

(54) PICKUP TRUCKS WITH COMPRESSED AIR TO DRIVE THE INTERNAL ELECTRIC RECHARGING SYSTEM TO UNLOAD WITHOUT THE NEED TO STEP INSIDE A FLAT BED

(71) Applicant: Heinz Welschoff, Fort Lauderdale, FL (US)

(72) Inventor: Heinz Welschoff, Fort Lauderdale, FL (US)

( * ) Notice: Subject to any disclaimer, the term of this patent is extended or adjusted under 35 U.S.C. 154(b) by 0 days.

(21) Appl. No.: 17/686,862

(22) Filed: Mar. 4, 2022

(65) Prior Publication Data
US 2022/0297549 A1    Sep. 22, 2022

Related U.S. Application Data

(60) Provisional application No. 63/162,901, filed on Mar. 18, 2021.

(51) Int. Cl.
*B60L 1/00*     (2006.01)
*B60J 5/04*     (2006.01)
(Continued)

(52) U.S. Cl.
CPC .............. *B60L 1/20* (2013.01); *B60J 5/0498* (2013.01); *B60L 1/003* (2013.01); *B60L 3/0046* (2013.01); *B60L 8/006* (2013.01); *B60L 50/15* (2019.02); *B60L 50/16* (2019.02); *B60L 50/61* (2019.02); *B60L 50/62* (2019.02); *B60L 50/70* (2019.02); *B60L 50/71* (2019.02); *B60L 50/90* (2019.02); *B60L 53/20* (2019.02); *B60L 53/22* (2019.02); *B60L 58/40* (2019.02); *B60W 10/08* (2013.01);
(Continued)

(58) Field of Classification Search
CPC .......... B60L 50/61; B60L 1/003; B60L 50/62; B60L 8/006; B60L 50/66; B60L 3/0046; B60L 58/40; B60L 1/20; B60L 50/70; B60L 50/71; B60L 10/16; B60L 50/15; B60L 7/10; B60L 50/90; B60L 53/22; B60L 53/20; B62D 33/0273; B62D 33/03; F17C 7/00; F17C 2203/0663; F17C 2221/031; F17C 2265/066; F17C 2270/0171; B60J 5/0498; H01M 2250/20; H01M 2220/20; B60K 2001/0461; B60W 10/08; B60W 30/18127
USPC ....................................... 180/65.31
See application file for complete search history.

(56) References Cited

U.S. PATENT DOCUMENTS 865,496 A * 9/1907 Herrington ............. F01B 17/02
                                                   60/412
1,902,124 A * 3/1933 Halloran .................. B60K 3/04
                                                   180/302

(Continued)

*Primary Examiner* — Atif H Chaudry
(74) *Attorney, Agent, or Firm* — Melvin K. Silverman

(57) ABSTRACT

Pickup trucks with an internal combustion engine (ICE), all electric, hybrid, plug in hybrid, must walk on loading flat bed, to load or unload, two stationary side walls, one-fold down tail gate, two taillights one on each side at the rear next to the fold down tail gate. With two full doors, with two full doors and with two smaller rear doors, or four full doors. It takes less compressed clean air to drive the DC alternators or DC generators from the compressed clean air engine. Also, the vehicle does drive 100% electric. A combination 100% electric and 100% compressed clean air system. No other vehicle has this kind of system.

5 Claims, 11 Drawing Sheets

(51) Int. Cl.
  *B60K 1/04*       (2019.01)
  *B60L 3/00*       (2019.01)
  *B60L 8/00*       (2006.01)
  *B60L 50/15*      (2019.01)
  *B60L 50/16*      (2019.01)
  *B60L 50/61*      (2019.01)
  *B60L 50/62*      (2019.01)
  *B60L 50/70*      (2019.01)
  *B60L 50/71*      (2019.01)
  *B60L 50/90*      (2019.01)
  *B60L 53/20*      (2019.01)
  *B60L 53/22*      (2019.01)
  *B60L 58/40*      (2019.01)
  *B60W 10/08*      (2006.01)
  *B60W 30/18*      (2012.01)
  *B62D 33/027*     (2006.01)
  *F17C 7/00*       (2006.01)

(52) U.S. Cl.
  CPC ... *B60W 30/18127* (2013.01); *B62D 33/0273* (2013.01); *F17C 7/00* (2013.01); *B60K 2001/0461* (2013.01); *F17C 2203/0663* (2013.01); *F17C 2221/031* (2013.01); *F17C 2265/066* (2013.01); *F17C 2270/0171* (2013.01); *H01M 2220/20* (2013.01); *H01M 2250/20* (2013.01)

(56) References Cited

U.S. PATENT DOCUMENTS

| | | | | |
|---|---|---|---|---|
| 3,704,760 | A * | 12/1972 | Maruyama | B60K 6/00 180/65.31 |
| 3,925,984 | A * | 12/1975 | Holleyman | F01B 23/02 180/65.245 |
| 8,890,342 | B2 * | 11/2014 | Alenezi | H02K 53/00 290/1 A |
| 2003/0025352 | A1 * | 2/2003 | Duffy | B60R 21/026 296/146.1 |
| 2004/0000343 | A1 * | 1/2004 | Turan, Jr. | B25F 5/00 137/561 R |
| 2004/0035617 | A1 * | 2/2004 | Chaney | B60K 1/04 180/68.5 |
| 2005/0225117 | A1 * | 10/2005 | Miskech | B62D 33/0273 296/183.1 |
| 2008/0088108 | A1 * | 4/2008 | Yoshida | H01M 50/296 280/200 |
| 2012/0267179 | A1 * | 10/2012 | Viengchai | B60K 6/387 180/65.265 |
| 2014/0125059 | A1 * | 5/2014 | Chen | B60L 53/14 290/45 |
| 2021/0086702 | A1 * | 3/2021 | Christensen | B60R 3/02 |

\* cited by examiner

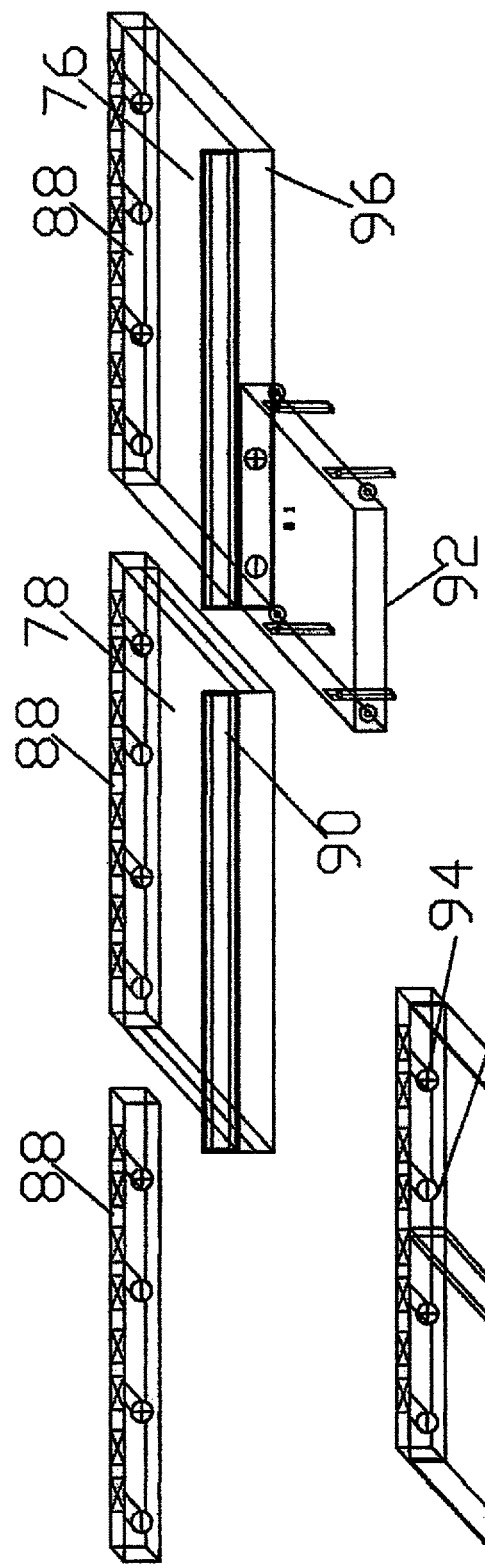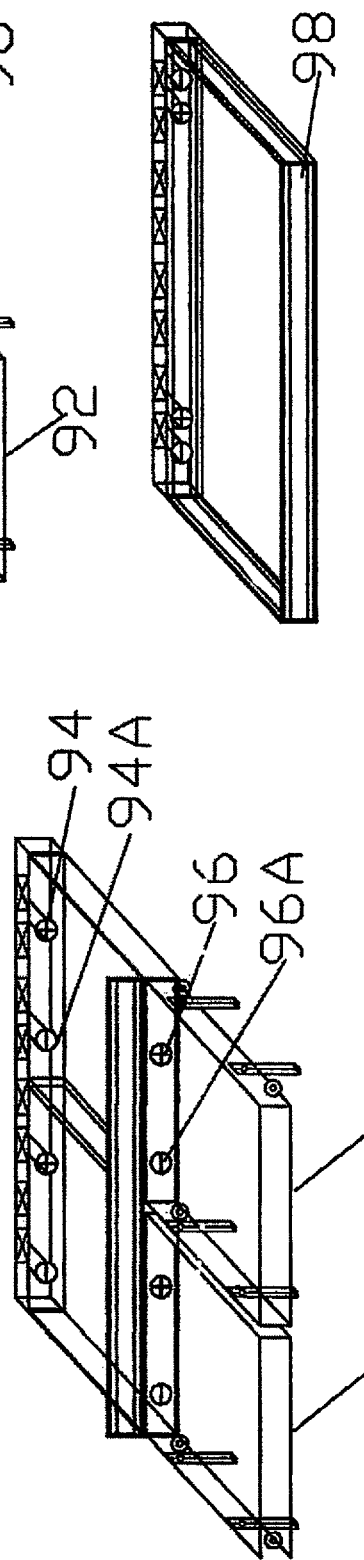

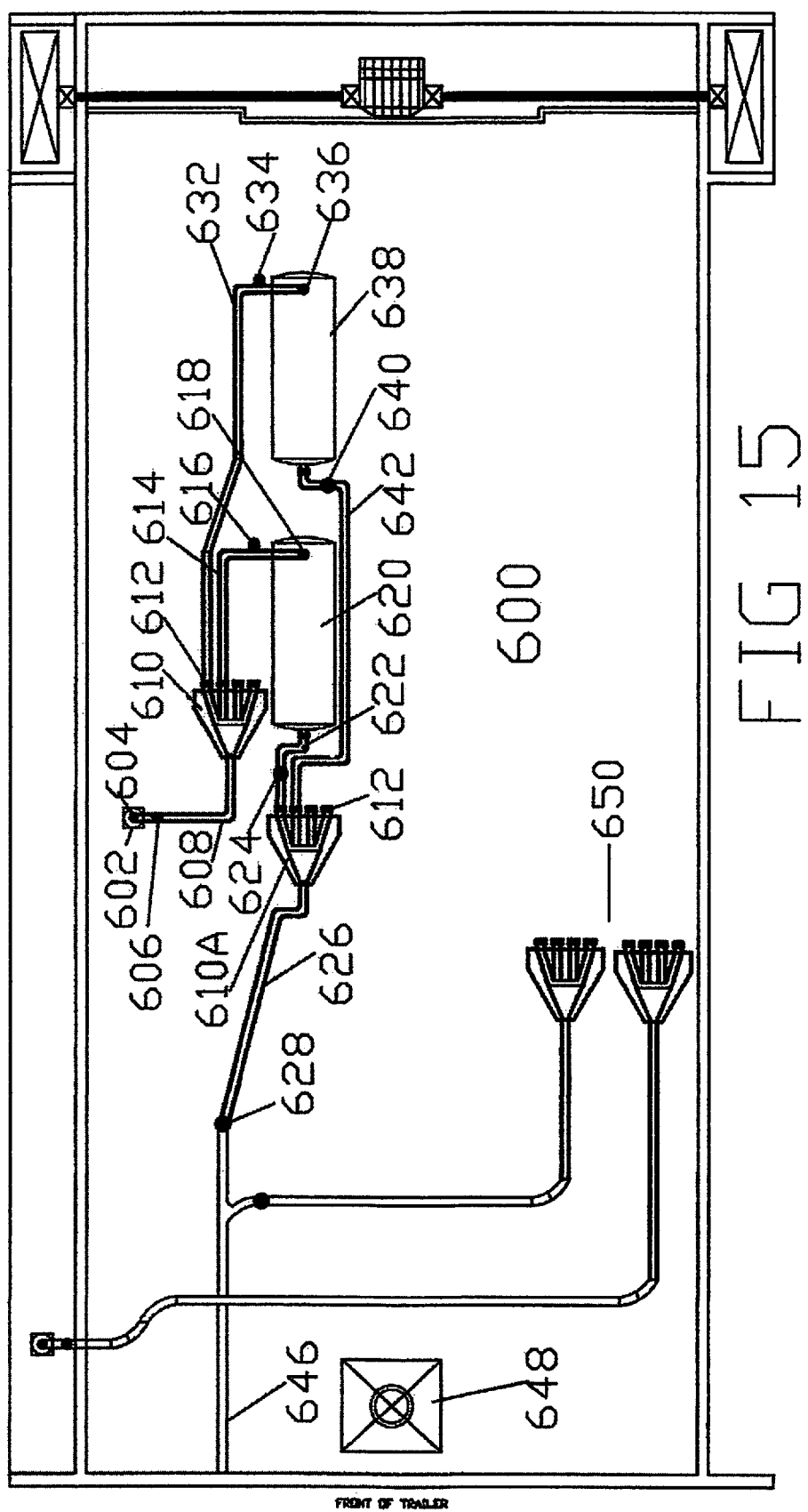

PICKUP TRUCKS WITH COMPRESSED AIR TO DRIVE THE INTERNAL ELECTRIC RECHARGING SYSTEM TO UNLOAD WITHOUT THE NEED TO STEP INSIDE A FLAT BED

REFERENCE TO RELATED APPLICATION

This application is a Utility Application of provisional Application No. 63/162,901, filed Mar. 18, 2021

FIELD OF THE INVENTION

The invention relates to an electric pickup truck with compressed air systems that can be easy loaded, easy unloaded without the need to step inside the flat bed.

BACKGROUND OF THE INVENTION

Pickup truck that can be easy loaded, easy unloaded without the need to step inside the flat bed. The pickup truck is designed for I.C.E., hybrid plug-in and all electric. The pickup truck also is designed for any door combinations. The two-tail gate adjustable spring-loaded hinges, one half are secured with screws unto the flat bed, the other half of the adjustable spring-loaded hinges are secured with screws to the tail gate. Two tail gate metal lock pins are screwed and secured unto the inside of the two free standing taillights side posts. Two additional support side cables are installed one end to the inside of the free-standing taillights posts and one end to the sides of the tail gate to secure the tail gate to stay level when folded down. Two locking mechanism are connected to the sides of the tail gate those two-locking mechanism lock unto the two-tail gate metal lock pins when tail gate is closed. The one or two unlock handles are mounted to the outside of the tail gate. One on each side or one in the middle. The spare tire and tools are mounted on top of the flat bed against the back wall and is part recessed into the flat bed, access and for easy install and removal of the spare tire and tools. At the driver side rear outside of the cabin is a separate metal post installed and fastens with metal screws or welded. One tail gate metal lock pin is screwed and secured unto the inside of the driver side separate metal post. Inside to the left of the driver side rear free-standing metal taillights post a metal lock pin is screwed and secured to it. The driver side penal is connected with three tail gates adjustable spring loaded hinges, one half are secured with screws unto the flat bed, the other half of the adjustable spring-loaded hinges are secured with screws to the inside side panel. Two mechanical locks are connected to the sides of the side panel, those two mechanical locks are connected unto the two metal lock pins one on the driver side new metal post and the other on the driver side free standing metal taillight post. The two unlock handles are mounted to the outside of the side panel. (One on each side or one single one only in the center). Two additional support side cables are installed one end to the inside of the free-standing taillights posts and one end to the sides of the side panel. The second one is connected to the inside of the new separate metal post and to the inside of the side panel.

As an option metal spring can be installed inside the side panel and connected to the additional support side cables for extra easy lifting of the side panel. A lift handle is installed at the inside of the side panel to help lift the side panels when folded down. The fold downside panels are on the driver and passenger sides, perspective and all have the same parts and functions. Including the rear ail gate.

Two full doors, four full doors and two full doors with two small rear doors.

The two small rear doors have the option with normal locking locks and outside handles. These two small rear doors also can be electric operational same as the front doors. The two rear windows are retractable. As shown, driver side window is halfway down, and the passenger side is closed. As shown on one of the engineering drawing the spare tire is installed at the right side of the flat bed under the passenger window. Also is recessed into the flat bed. As shown on one of the engineering drawings, a special battery storage metal box with the front opening also contains a front fold down sealing cover is designed and installed on the driver side and connected to the underside of the flat bed and chassis. Inside of the battery storage metal box contains a multiple electric metal or plastic connection panel that is connected to the rear of the special battery storage metal box. The multiple electric metal connection box contains multiple electrical cable connections at the rear. At the front of the multiple electric metal or part plastic connection panel, are positive and negative electric female metal connections that are shown inside at the rear of the special battery storage metal box. The multiple positive and negative female electric metal connections about 20 MM long are exposed inside and to the rear of the first and second special battery storage metal box. Inside of the special battery storage metal box are the battery packs. One battery pack at the left and the other battery pack on the right. Additional battery packs can be installed depending on size of vehicle and the power needed. The positive and negative female electric metal connections are receiving the male positive and negative battery packs connections. Special electric cables from the multiple male and female electric metal and part plastic special battery storage connections box. The replaceable battery packs contain two movable support metal legs mounted on the sides of the battery pack. Also are including four metal or rubber wheels, two on each side. The four wheels are for easy moving of the movable install and or replaceable battery packs from the special battery storage metal box. When battery pack is pushed inside the special battery packs storage metal box true the front opening, thus connect the battery packs electrical positive and negative male to the electric metal or plastic electric connection panels electric females. At this time the battery packs supply electric energy to the multiple male female electrical cable connections box. As soon as the electrical multiple male and female electric connections are connected than the replaceable batter automatically locked into the special battery storage metal box. After that the front sealing cover is pushed closed and sealed.

All existing 48 and up, voltage electrical cables are already connected to the multiple electrical charging systems. All other electrical functions are as per Heinz Welschoff U.S. Pat. No. 10,569,638, Feb. 25, 2020.

In the event they should be a problem with one of the battery packs, the front sealed cover of the special battery storage metal box can be open from the inside cabin so that the defective battery pack can be easily pulled out of the special battery storage box and easily replaced with a new one in about 15 minutes, about 15 minutes or less. All boxes and electrical connections are waterproof sealed.

SUMMARY OF THE INVENTION

Pickup trucks with an internal combustion engine (ICE), all electric, hybrid, plug in hybrid, walk on loading flat bed, two stationary side walls, one-fold down tail gate, two taillights one on each side at the rear next to the fold down tail gate. Options: With two full doors, or with four full doors, or two full doors with two rear small doors. With the two full doors and the two rear small door they is a center post same as the four doors system including the two rear small door will have a normal outside door handle and inside opening handle. The two small doors can be installed so that they open from center to the front or from the rear post to the back and lock at the center post. This system increases the strength in the center to support the bottom frame to the roof, like the four-door system.

It has been known for many years that compressed air engine and compressed air tank system, whereas the compressed air engine drives the vehicle. Powered by the compressed air from the compressed air tanks. In this patent the compressed air engine only drives the recharging systems/DC alternators or DC generators does it takes less compressed air to drive the DC alternators or DC generators. Also, the vehicle does drive 100% electric. A combination 100% electric and 100% compressed air system. No other vehicle has this kind of system.

BRIEF DESCRIPTION OF THE DRAWINGS

The all-new electric Pickup Truck Design whereas the body has been redesigned as per the engineering drawings from FIG. 1-15. Also, all electric components and recharging system are included as per Welschoff's U.S. Pat. No. 10,569,638, B2 Feb. 25, 2020.

The passenger fold down panel is locked unto the passenger free standing taillight post and passenger separate metal post connected to the rear of the passenger cabin side.

Figure 3:
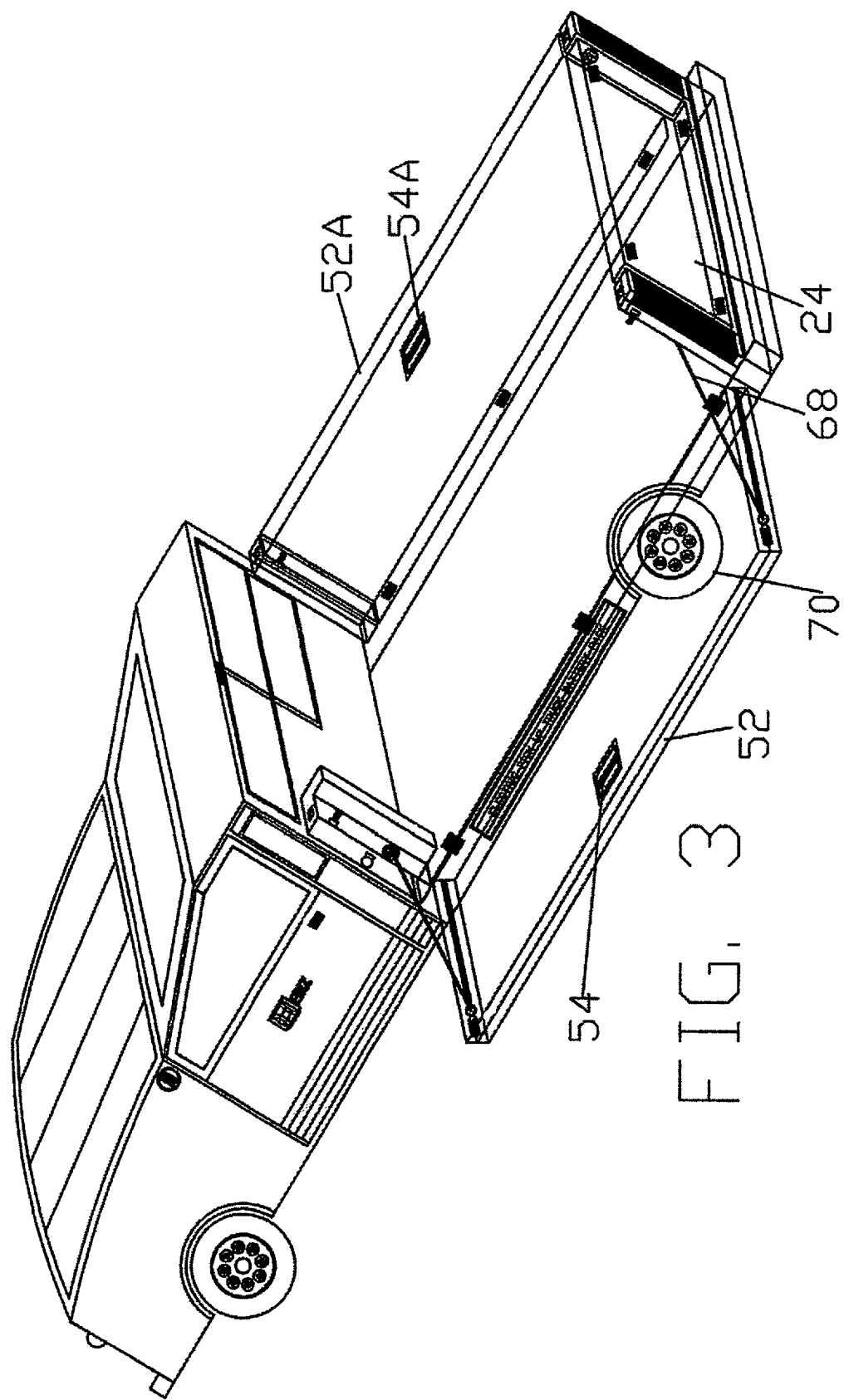

FIG. 3 the driver side foldable side panel 52, has an inside lift handle 54, to lift driver foldable side panel 52, same as passenger foldable side panel 52, when in the down position, driver side rear wheel 70, showing under the foldable side panel 52, rear tail gate 24, locked into both free standing rear tail lights posts, 22, 22A, also is a perspective view whereas the driver side panel is down in a perspective level position but folds down completely perspective if needed. The fold down tail gate is locked unto both free standing taillights posts and to the flat bed with a special locking system.

Figure 4:
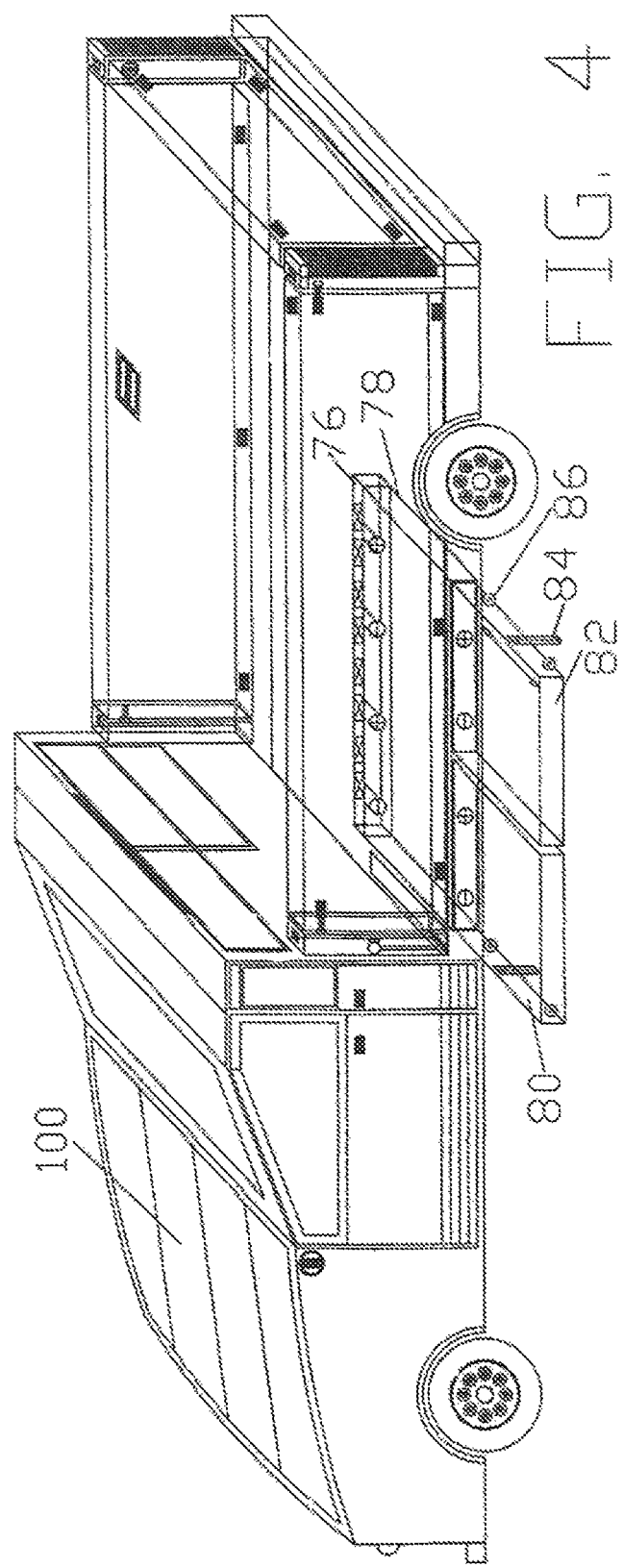

FIG. 4 is a perspective closed view. Whereas the special battery storage metal box with the electric cable connection board is mounted directly to and under the body and frame. The battery packs are shown in a pulled-out position and ready to push inside the special battery storage metal box. The wheels and support legs are shown.

FIG. 5 is a perspective closed view of the electrical cable connection box.

FIG. 6 is a perspective closed view. Whereas the electrical cable connection box is connected to the special battery storage metal box.

FIG. 7 is a perspective closed view. Whereas the electrical cable connection box is connected to the metal storage box and one battery pack is shown in a pulled-out position and ready to push inside the special battery metal storage box. The wheels and support legs are shown.

FIG. 8 is a perspective closed view. Whereas the electrical cable connection box is connected to the rear outside of the special battery metal storage box and two battery packs are shown in a pulled-out position and ready to push inside the special battery metal storage box. The wheels and support legs are shown.

Figure 10:
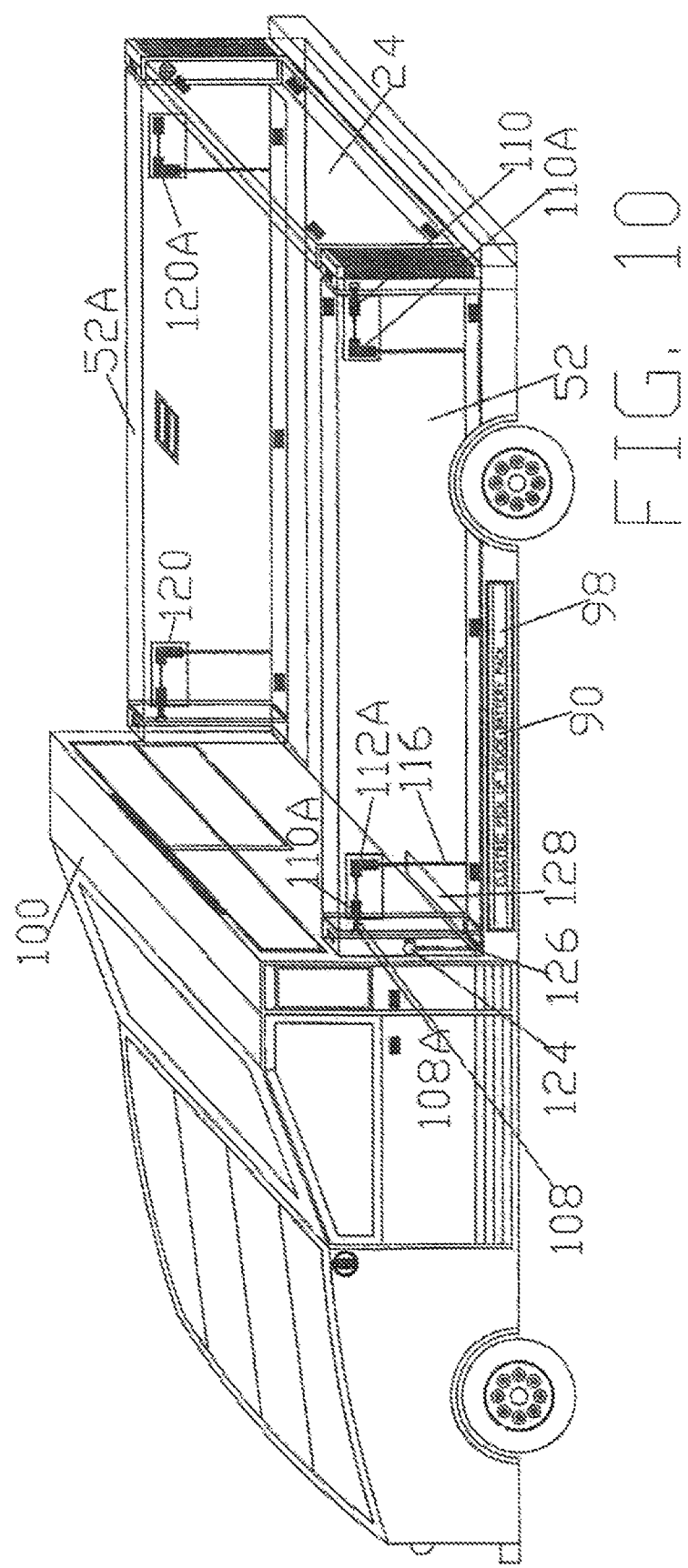

FIG. 9 is a perspective closed view. Whereas the electrical cable connection box is connected to the rear outside of the special battery metal storage box and two battery packs are shown in an installed position and connected to the electrical cable connection box FIG. 10 is a perspective closed view. Whereas shows the automatically electrical lock solenoids and the closed special battery metal storage box.

Figure 11:
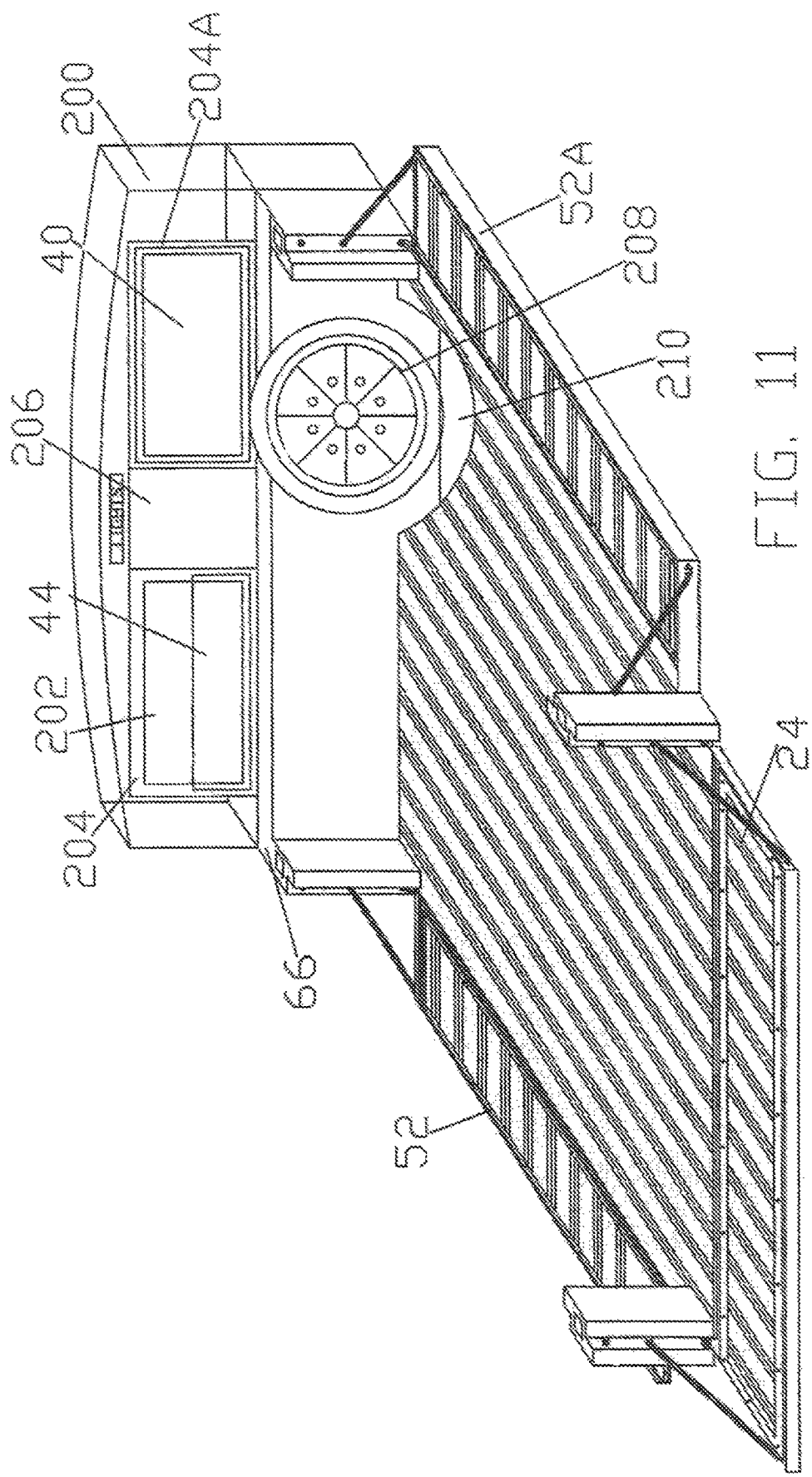

FIG. 11 is a perspective closed view. Whereas the driver side panel completely down tail gate lowered to a flat position and showing all of the adjustable spring-loaded hinges.

Figure 12:
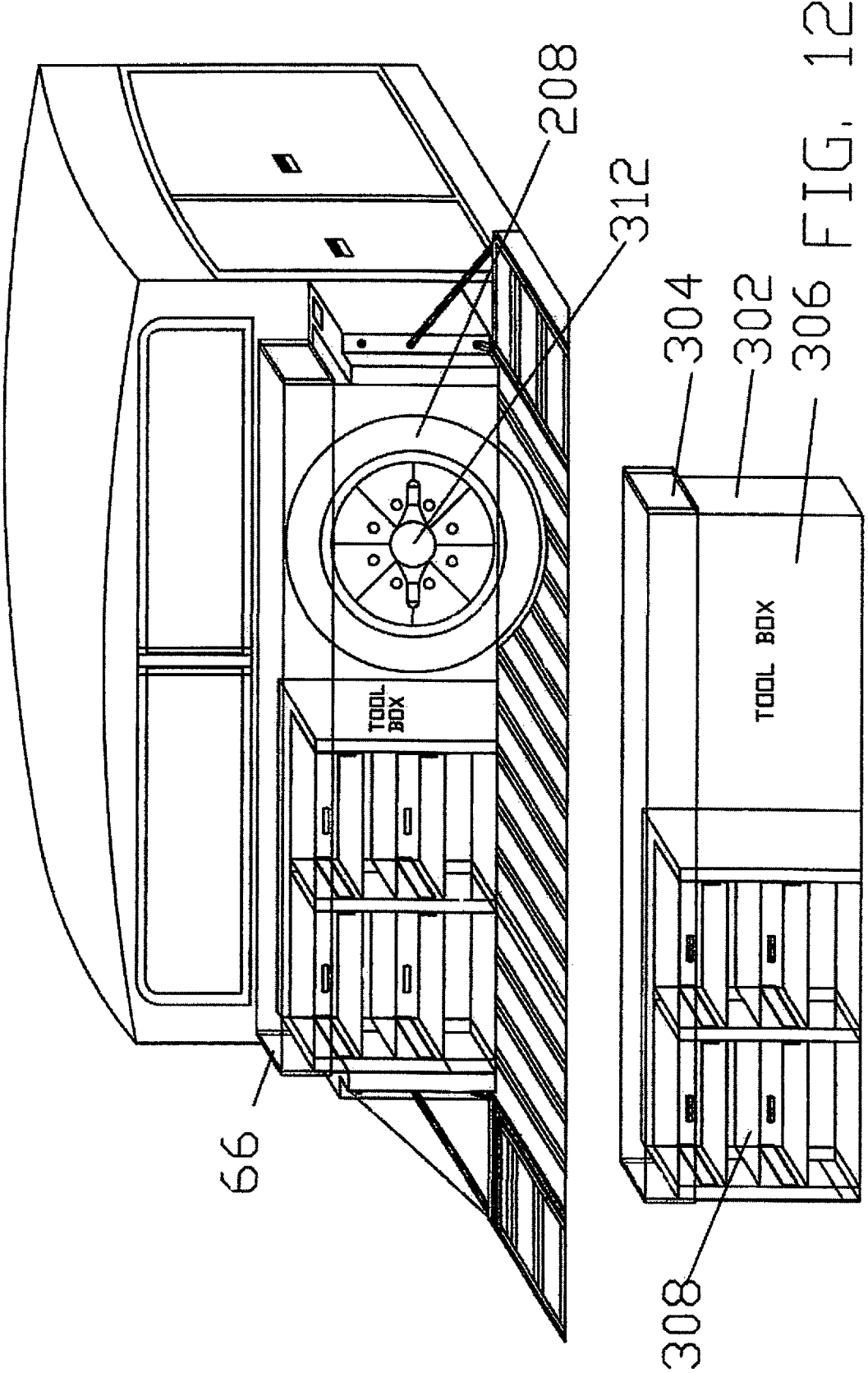

FIG. 12 is an open view of the flat bed with both side panels open including the tail gate. The front driver cabins, at the rear, are the driver and passenger electric retractable windows with a center wall and frame for the retractable windows, above the wall and frame is the rear stop and backup light system.

Driver side rear window has been lowered down halfway. The passenger rear window is closed. Inside the flat bed at the passenger side is the spare tire and against the inside of the flat bed wall and is lowered inside the flat bed as show does stop the spare tire from moving also inside it has a water drain hole. At the left of the spare tire is an empty space that will hold a special designed toolbox, it will show at FIG. 13. Also shown are the two front flatbed posts for locking the two side panels, at the rear of the flat bed are the two free standing taillights posts that connect the two side panels and the tail gate.

Figure 13:
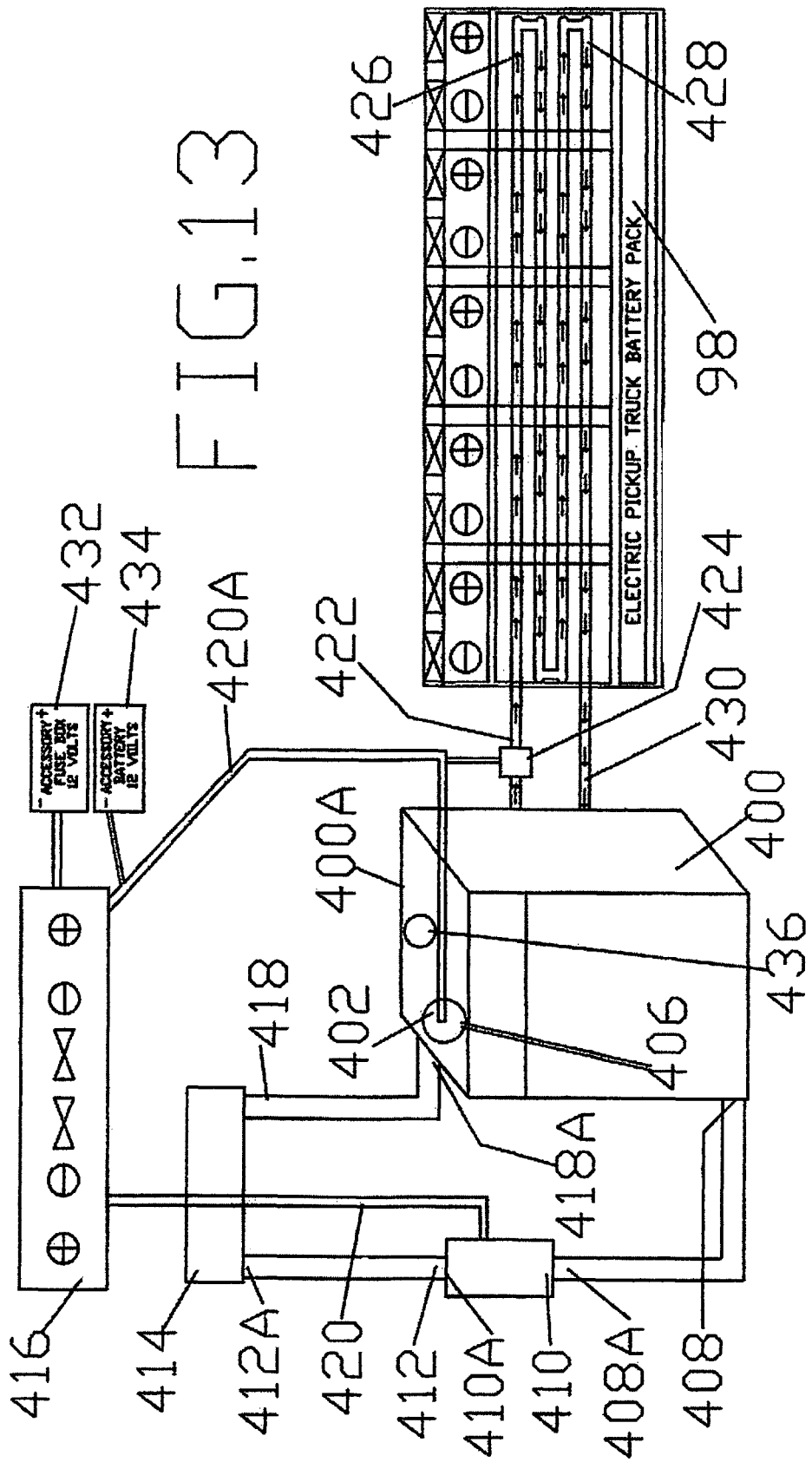

FIG. 13 is a view of the flat bed, whereas the complete special designed toolbox is installed inside the flat bed against the inside of the front flatbed wall. The spare tire is located inside the special toolbox including all drawers, two lockable sliding front doors and a lockable top cover.

Figure 14:
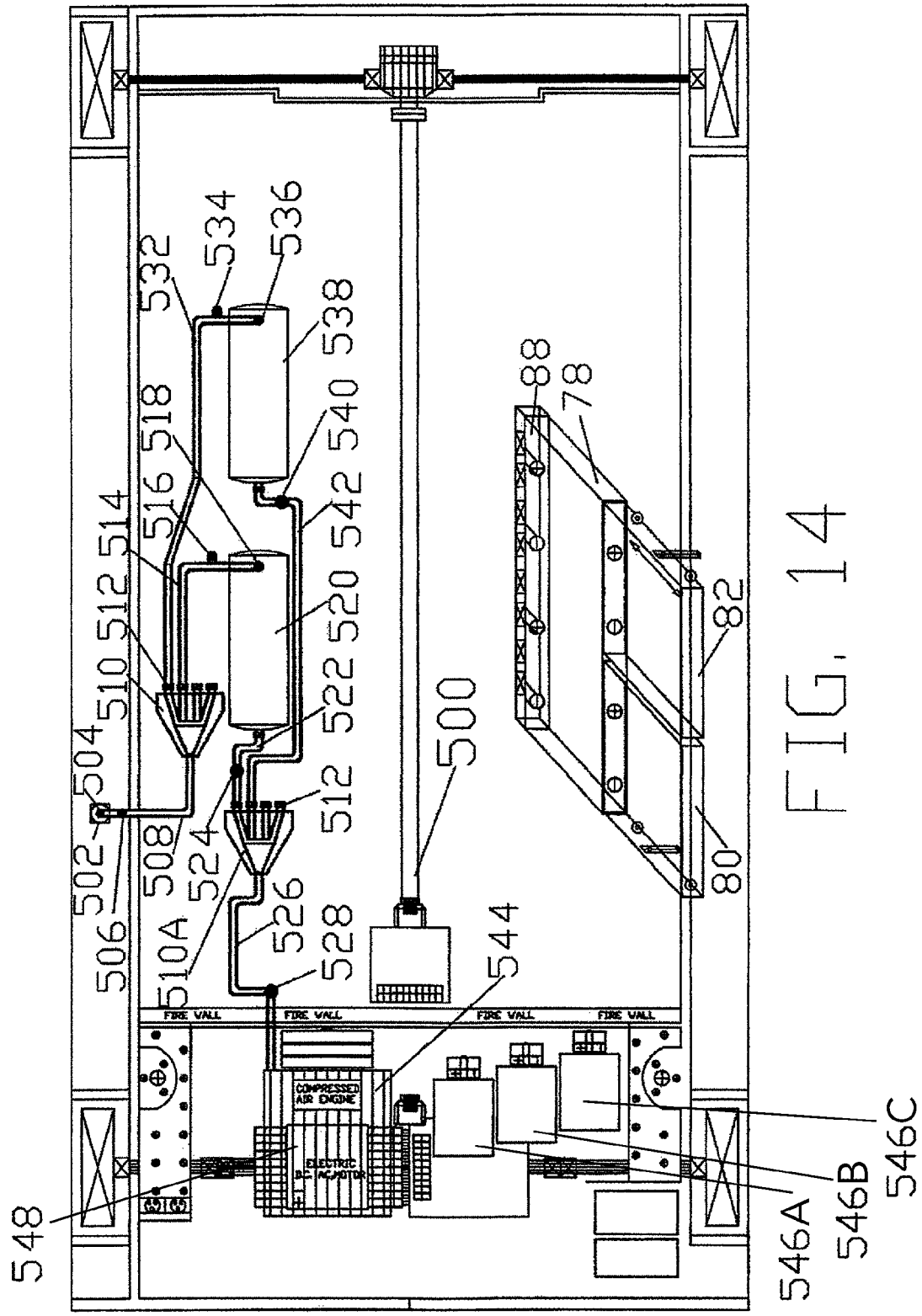

FIG. 14 is a perspective view of the independent electric water heating system for the inside of the driver cabin and the special battery metal storage box. The electric water heating system for the driver cabin function same in an ICE vehicle. This electric water heating system works totally independent so that it does not use the electric from the battery packs. Does mom mileage when driving. The same system is also to be used for, to warm up the special battery metal storage box and to warm the battery packs in cold weather.

FIG. 15 is a perspective view of the cooling system for the electric motor, the special battery metal storage box and battery packs. This independent cooling system works totally independent so that it does not use the electric from the battery packs. The cooling system for the special battery metal storage box, battery packs and electric motor.
Can function when driving and or standing still.

DETAILED DESCRIPTION OF THE INVENTION

Figure 1:
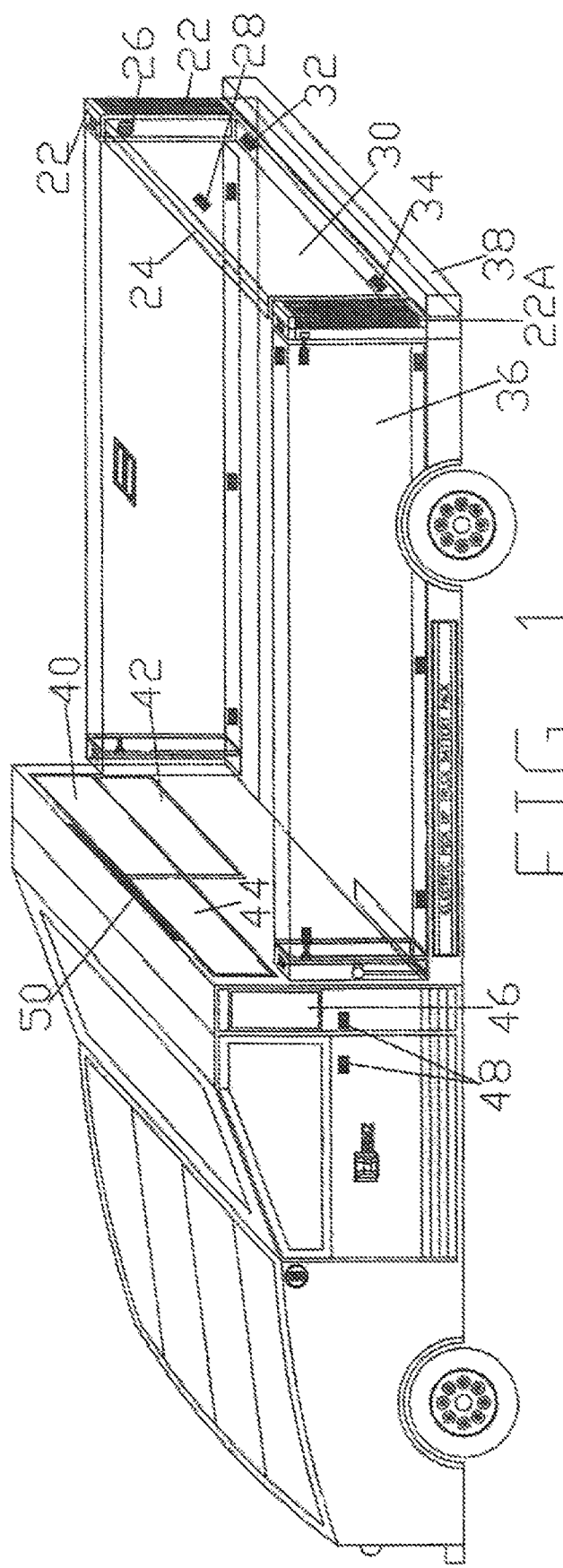
FIG. 1 provides a complete perspective assembled closed view of the present invention.

FIG. 1 shows the complete electrical and the battery recharging systems under the front hood including the compressed air engine. All items under the front hood are the same as per Welschoff's U.S. Pat. No. 10,569,638, filed Feb. 25, 2020. All items under the front hood are the same except for the clean fuel engine, radiator, clean fuel tank under the chassis and exhaust system, plus other minor parts. The clean fuel engine has been replaced with a compressed mechanical clean air engine.

FIG. 1 is also a perspective view of the complete pickup truck. The passenger and driver side free standing tail lights posts, 22, 22A are connected to the body's flatbed floor with screws, or welding, the tail gate 24, the tail gate 24, is showing from the rear 30, is connected to the body's flatbed floor 36, with two adjustable spring loaded hinges 32, 34, the two spring loaded hinges 32, 34 are connected to the body's flatbed floor 36, all spring loaded hinges are installed with screws and covered with a plastic cover, the tail gate 24, is showing from the rear 30. Metal lock pins 26, are connected to the free-standing taillights post 22, 22A, center unlock handle 28, is connected to the outside of the tail gate 24, a rear bumper 38, rear passenger and driver side windows 40, 44, are movable up and down into the body wall 42. The rear passenger door with an electric movable window 46, two door handles 48. A third stop light 50.

Figure 2:
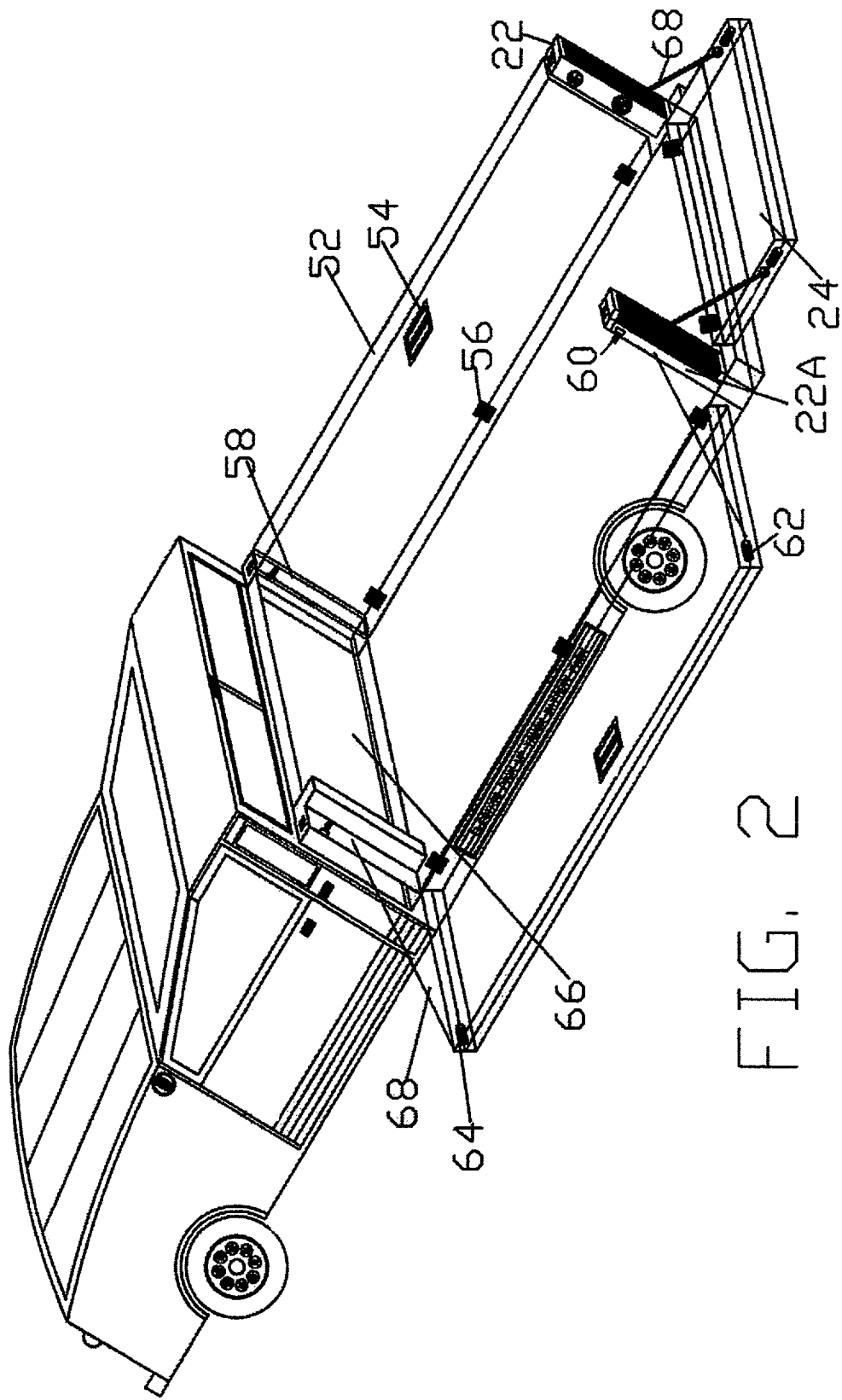
FIG. 2 is a perspective view assembly whereas the tail gate is downward in a level position. The tail gate has two holding cables and two adjustable spring-loaded hinges. Whereas the driver side fold downside panel is downward in a level position but folds down completely perspective if needed. Including are three adjustable spring-loaded hinges that are connected to the flat bed and the fold down panel. The free-standing taillight post on the driver side is now showing. A lift handle is shown on the inside of the fold downside panel.

FIG. 2 of the passenger foldable side panel 52, is connected to the separate front metal post 58, that is part and connected to the front wall 66, of the flatbed 36, but it is separate from the driver cabin, showing at the rear outside and connected to the passenger free standing taillights post 22, an inside lift handle 54, to lift passenger foldable side panel 52, when in the down position.

As shown are three adjustable spring loaded hinges 56, that are connected with metal screws unto the passenger foldable side panel 52,
and connected to the body's flatbed floor 36, all adjustable spring loaded hinges 56, are installed with screws and covered with a plastic cover.

Metal lock pin 60, is connected to the driver side free standing taillights post 22, driver foldable side panel, same as passenger foldable side panel 52, is down and in a level position, and have two locking mechanism 62 and 64, that are locked unto the metal lock pins 60, to the rear tail gate 24, all holding cables 68, are connected to the rear tail gate 24, both side panels 52, two front posts and two free standing tail lights posts.

FIG. 3 the driver side foldable side panel 52, has an inside lift handle 54, to lift driver foldable side panel 52, same as passenger foldable side panel 52, when in the down position, driver side rear wheel 70, showing under the foldable side panel 52, rear tail gate 24, locked unto both free standing rear taillights posts, 22, 22A.

FIG. 4 is a perspective view of the complete pickup truck, 100, as shown is whereas the electrical cable connection panel 76, is connected to the rear of the special battery metal storage box, 78, and two battery packs number 80, 82, are shown in a pulled out position and ready to push inside the special battery metal storage box 78, four support legs 84, are connected to the two battery packs metal boxes and are in a fold down position after the battery packs have been pulled out of the special battery metal storage box 78, once each of the battery packs 80, 82, are pushed inside the special battery metal storage box 78, than the four support legs 84, are automatically lifting up in a level position, battery packs 80, 82, are automatically electrically connected to the electrical cable connection panel 76. Four wheels 86, are connected to each of the battery pack's box, does makes it easy to move the battery pack's 80, 82, in and out of the special battery metal storage box 78.

FIG. 5 is a perspective view of the electrical cable connection panel 88.

FIG. 6 is a perspective view of the assembly, of the electrical cable connection panel 76, and the special battery metal storage box, 78, the front lift protection battery pack cover 90, of the special battery metal storage box 78, is at this time in an upright position and is connected with hinges (hinges not shown), special battery metal storage box 78, is at this time in an open position 92.

FIG. 7 is a perspective view of the partially assembly, the electrical cable connection panel 76, the special battery metal storage box 78, and one exposed battery pack, 80, FIG. 8 is a perspective view of the partially assembly, of the electrical cable connection panel 88, the special battery metal storage box 78, and two exposed battery packs. 80, 82, the electrical cable connection panel 88, shows the metal male positive connection 94, shows the metal male negative connection 94A, all of them are exposed at the rear inside the special battery metal storage box 78, the two exposed battery packs 80, 82, have one positive and one negative electrical connection at the rear of battery packs 80, 82, when battery packs 80, 82, pushed into the special battery metal storage box 78, then each of the two female electrical connection 96, 96A pressure fit over the two male connections 94, 94A, does create electricity to the electrical cable connection panel 88, and to all cables for the electric motor, recharging systems, DC alternators or DC generators, when battery packs 80, 82, need to be recharged than the electric is been supplied by the DC alternators or DC generators to the electrical cable connection panel 88, from the electrical cable connection panel 88, to the battery packs 80, 82. DC alternators or DC generators, are shown in the Heinz Welschoff U.S. Pat. No. 10,569,638, 2020.

FIG. 9 is a perspective view of the complete assembly 98, of the electrical cable connection panel 88, the special battery metal storage box 78, and one or two battery packs. 80, 82, whereas the one or two battery packs 80, 82, are locked inside the waterproof sealed special battery metal storage box 78. At this time the front lifts up battery pack protection cover 90, is in a downward locked position and sealed to the waterproof sealed special battery metal storage box 78 and connected with hinges. (Hinges not shown).

The front lifts up battery pack protection cover 90, is in a downward locked position, when needed to unlock the front lifts up battery pack protection cover 90, a special unlock handle is inside the driver cabin next to the outside of the driver seat including a battery pullout tool. (Not shown) for easy, fast to open the front lifts up battery pack protection cover 90, for removal of the battery packs 80, 82, for normal wear and tear replacement and or for emergency, like overheating, defect, or an electrical short, smoke or fire inside the waterproof sealed special battery metal storage box 78, smoke or fire inside the battery packs 80, 82. They should be no smoke or fire due to the metal protection box for the battery packs 80, 82, and the separate waterproof sealed special battery metal storage box 78.

FIG. 10 is a perspective view of the complete pickup truck 100, as shown is the driver side electrically fold downside panel 52, in an upright closed view, the passenger side electrically fold downside panel 52A, is in a upright closed view, when activated by the remote key, then the two electrically solenoids 112, 112A, release both mechanical locks 110, 110A, from the metal lock pin 108,108 A, at the same time and at that moment the driver side electrically fold downside panel 52, is in a upright closed view start slowly folding totally down perspective. Electrical cables from the electrical solenoids 116, 118, are connected to the remote panel and to a 12-volt electric fuse box. All mechanical locks 110, 110A, are covered with a push lock service metal or plastic cover. (Not shown) Two electrically solenoids 120, 120A, mounted inside the passenger side electrically fold downside panel 52A, when activated by the remote key, then the two electrically solenoids 120, 120A, release both mechanical locks 120, 120A, from the metal locks pins (not shown), at the same time, at that moment the passenger side electrically fold downside panel 52A, is in an upright closed view start slowly folding totally down perspective. Electrical cables from the electrical solenoids 120, 120A, are connected to the remote panel, and to a 12-volt electric fuse box. All mechanical locks 120, 120A, are covered with a push lock service metal or plastic cover. The electrically fold down tail gate 24, functions the same way as the two electrically fold downside panels 50, 52.

The remote key has three extra numbers 1-3, one number for each side panel and one number for the tailgate. The waterproof sealed special battery metal storage box 78, the front battery pack water sealed protection cover 90, is connected with hinges. (Hinges not shown). To the waterproof sealed special battery metal storage box 78, fill up opening for compressed clean air with cover 124, compressed clean air line 126, compressed clean air carbon fiber tank 128.

FIG. 11 is a horizontal view of the pickup truck's flat bed and front driver cabin 200. Front cabin 136, flat bed front wall 138, flat bed front wall post 140, flat bed front wall post lock pin 142, flat bed front wall post side panel stop 144, flat bed front wall post side panel chain or cable 160, flat bed front wall post side panel hinge 162, fold down side panel 164, spare tire groove 158, free standing tail light post 166, spare tire 168, empty space for tool box 170, center wall 146, third brake light 148, passenger retractable window 150, window frames for windows 150, 152, window open space half way 154, window lowered to half way 156.

FIG. 11 is a perspective view of the complete open flat bed with frond driver cabin 200, driver side window space shows half open 202, driver side window glass shows half way down 44, driver side window frame 204, passenger side window frame 204A, rear center wall 206, of driver cabin, spare tire/wheel 208, is located against the front flatbed wall 66, a quarter moon recesses into the flatbed 210, keeps the tire/wheel steady and at the bottom of the quarter moon 210, is a hole for any liquid to run out, driver side and passenger panels 52, 52A are in a down horizontal position, tail gate 24, is in a down horizontal position, FIG. 12 is a perspective view of the complete toolbox 302, top sealed cover 304, front sliding doors 306, drawers 308, the toolbox is placed against the flat panel wall 66, spare tire/wheel 208, is located inside the toolbox 302, this protects the tire/wheel from dirt, and theft, also it is easy to remove and reinstall only with one lock nut or screw 312. Driver Cabin & Sealed Battery Packs Water Heater and Water-Cooling Systems FIG. 13 driver cabin and waterproof sealed special battery metal storage box 78, battery packs 80, 82 heater coil copper metal single line 422, when driver activate the driver cabin, water heater system on driver cabin dash same type as in a normal ICE vehicle, the 12+ voltage water heater element 402, starts to heat up the water inside the plastic or metal water heater tank, 400, plastic or metal water heater tank, 400, is filled with water and antifreeze so that the water does not freeze, the water heater element 402, receives electric from wiring 420A, wiring 420A, is connected to the electrical fuse box 432, electric wiring 420A, is also connected to the driver cabin dash heater control system, connected at the bottom left sidewall of the plastic or metal water heater tank 400, a lower water heater hose 408, second end of lower water heater hose 408A, is connected to lower inlet opening of water pump 410, first lower end of upper water heater hose 412, is connected to the exit outlet of the water pump 410A, second end of upper water heater hose 412A, is connected to the driver cabin dash internal heater core 414, water flow true the water heater core 414, and exit true upper end of exit water heater hose 418, water heater hose 418, lower end of water heater hose 418A, and is connected to upper plastic or metal water heater tank 400, electric wiring 420, to the water heater pump 410, electric wiring 420A, to the water heater element 402, and both continue to heater controls on the internal driver cabin dash.

This system allows not using electric power from the main battery pack system. Does save mileage from the battery packs. Special battery metal storage box 78, whereas a horizontal round hollow water heater metal tubing element 422, is installed inside special battery metal storage box 78, with extra space and above battery packs 80, 82. The round hollow water heater metal tubing element 422, is connected to water heater tank 400, an electric 12+ volts water pump 424, is connected between the upper inlet pipe 422, and the plastic or metal water heater tank 400, water is always throughout the complete system, the lower water return pipe 430, of the horizontal round hollow water heater metal tubing element 422, and is connected to water heater tank 400, water flows thru pipe 422, to end of 426, than travels thru the complete system and start exiting at 428, to pipe 430, and back into plastic or metal water heater tank 400, Warm or hot water is flowing thru the complete heating system at all times until the heating system is turned off. The plastic or metal water heater tank 400, has a top protective cover 400A. The heating system has a multiple function system. 1. For cabin heating, the driver turns on the heater inside the cabin, does electric is activated from the 12+ volts battery, does heat up the water element 402, as soon as the water inside the water tank 400, is at normal adjusted temperature, then the electric water pump 410, is activated and force the hot water true the hallow heater core under the dash, fan is activated, does heating the inside of the cabin. (Like a normal ICE vehicle) a few seconds later the second electric water pump 424, is activated and force the hot water true the round hollow water heater metal tubing element 422, does heat up the inside of the battery pack's metal storage box 78, and does heat up the battery pack's 80, 82, No need to use battery electric from the main battery packs. The 12+ volts battery is always charged by a 12+ volts alternator when the electric motor is turned on or is also automatically activated when the battery packs 80, 82 been recharged by the compressed air engine system. An additional electric cable 406, is connected to water heater element 402, special extension cord 120 volts can be connected to the 12 volts cable 406, (Not shown, would be supplied with new electric vehicle) and connected to any 120 volts outlet at home. Once electric cable 406, is connected driver than can activate the electric water pumps 410, electric water pump 424, circulate the hot water or metal water heater tank 400, from water tank 400, and true the complete heating system. This system keeps the special battery metal storage box 78, and battery packs 80, 82, at a warm temperature. This allows the driver to drive away without cold battery packs and no need to plug-in to charge, warm the battery pack's 80, 82, before driving. Also, it is not recommended to charge the battery pack's when cold. The plastic or metal water heater tank 400, has a protective top cover 400A, a water-cooling fan 436, when battery packs 80, 82, reach a certain heat temperature electric water pump 424, is automatically activated and forcing the water from plastic or metal water heater/cooling tank 400, and circulate true the round hollow water heater/cooling metal tubing element 422, also in the next second the water-cooling fan 436, is activated and cooling the water inside the plastic or metal water heater/cooling tank 400, does keeps the battery packs 80, 82, in its best operating temperature. This system replacing the water-cooling system between the existing types of battery packs and eliminate water leaks, overheating and also possible fire, it has been shown in EV's.

FIG. 14 for delivery trucks shows the complete compressed lean air that is located and connected to the vehicle's chassis. At the passenger side is the compressed clean air inlet valve protection lock cover 502, one-way compressed clean air inlet connection 504. one way compressed clean air inlet pipe valve 506, one way compressed clean air inlet pipe 508. compressed clean air inlet pipe distribution system 510, compressed clean air pipe locking systems 512, compressed clean air inlet pipe 514, compressed clean air electric gauge 516. compressed clean air one way air inlet gauge 518, compressed clean air carbon liber tank number one 520, compressed clean air exit pipe 522, computer controlled compressed clean air exit pipe valve 524, this controls the amount of air flow and pressure to the compressed clean air engine 530, to run the electric multiple recharging systems A/C D/C alternators or A/C D/C Generators as per Heinz Welschoff U.S. Pat. No. 10,569,638 B2 Feb. 25, 2020. To recharge the battery packs 80,82. Compressed clean air exit pipe distribution system 510A, compressed clean air continuous true compressed clean air exit pipe 526, computer controlled compressed clean air exit pipe valve 528, this controls the amount of air flow and pressure to stop air backflow. The complete same functions are for the second compressed clean air carbon fiber tank 538, 532,534,536, 540,542, 512, 510A 526, 528. Shown is the special battery metal storage box 78, with the battery packs 80,82, with the electrical cable connection box 88. At first the compressed clean air valve cover 502, to be open, then the compressed clean air handle from the compressed clean air filling station is pushed unto the compressed clean air nozzle 504, and lock. Push the handle leaver does release the compressed clean air true the compressed clean air one way valve 506, continue true the compressed clean air pipe 508, and continue true the compressed clean air into the compressed clean air inlet distribution system 510, compressed clean air continue to flow true the compressed clean air pipes 514, 532, continues true the electric compressed clean air valves 518, 536, at this moment the compressed clean air fills up the compressed clean air carbon fiber tanks 520, 538, Once the compressed clean air carbon fiber tanks 520, 538, are completely full, than the compressed clean air station handle shuts off automatically and all one way valves 506, 518, 536, the two compressed clean air electric pressure gauges 516, 534. will show how much compressed clean air is in the tanks 520, 538, when the two compressed clean air electric pressure gauges 516, 534, show that each of the compressed clean air carbon fiber tanks 520, 538, are getting low on compressed clean air, each compressed clean air carbon fiber tanks 520, 538, has its own compressed clean air gauge on the driver cabins dash regardless how may air tanks this will tell exactly how much air has been used, but only one air tank at a time is been used until empty than the computer switching to next full one. If the driver happens the need to take a brake and the driver happens at a air filling station than the driver has the option again to fill the empty air tanks does longer distance driving without stopping. When the battery packs are depleted about 40-50% the computer activates the compressed electric clean air one way valves 524, so that the compressed clean air flow forward true the compressed clean air exit distribution system 510A, and true compressed air pipe 526. and opens second electric clean air one way valve 528, once the compressed clean air electric one way valves 524, 528, opens than the compressed clean air continues forward into the compressed clean air engine 544, under the front hood, thus turn the compressed clean air engine at any RPM as needed to turn the necessary AC or DC, alternator's to recharge the battery packs 80, 82, when battery packs 80, 82, are fully recharged than the computer shuts off the compressed clean air electric one way valves 524, 528. All electrical recharging systems function the same normal as per U.S. Pat. No. 10,569,638 B2 February 25. As may be seen, a plurality of alternators or generators 546A, 546C, 546D are positioned synchronously perpendicular to a compressed air engine 544, to allow the rotational energy of the compressed air engine to engage the alternator or generator, as is standard in the industry, and convert the rotational energy to power, which can feed the electric engine 548 as shown in FIG. 14. It should also be noted that the compressed air engine may also be referred to under the industry standard name of a "pneumatic motor".

FIG. 15 has the same compressed air system; it is designed for large trucks with large trailers. The electric power train motor, battery packs 80, 82, compressed clean air engine 544, plus all other normal items as mentioned above are all inside the truck, for large trailers, the compressed air pipe 646, has been extended out in front of the trailer 600, so that it can be connected to the trailer truck thus supply the compressed clean air to the compressed clean air engine 544. It shows on the trailer the front connection for the truck like normal 648, additional compressed clean air system can be added as needed 650, depending on size of the trailer.

While there has been shown and described above the preferred embodiment of the instant invention it is to be appreciated that the invention may be embodied otherwise than is herein specifically shown and described and that within said embodiment, certain changes may be made in the form and arrangement of the parts without departing from the underlying ideas or principles of the invention as set forth in the Claims appended herewith.

I claim:

1. A vehicular power train system, comprising:
   at least two independent motors;
   a first motor in said at least two independent motors is an electric motor, and a second motor in said at least two independent motors is a pneumatic motor;
   at least one removable battery pack, wherein each battery pack in said at least one removable battery pack is disposed in a lower storage compartment of a vehicle, wherein each storage compartment includes an internal cavity for housing said at least one removable battery pack and a fold-down sealing protection cover;
   said at least one removable battery pack configured to provide electric energy to the electric motor;
   said lower storage compartment having a pair of electrical connection prongs complemental to each battery pack in said at least one removable battery pack, wherein each pair of electrical connection prongs includes a positive prong and a negative prong that engages with a female electrical engagement means on each battery in said at least one removable battery pack;
   said pneumatic motor is coupled to a plurality of alternators or generators, wherein said plurality of alternators or generators generate electrical energy for said electric motor and said at least one removable battery pack when said pneumatic motor engages with each alternator or generator in said plurality of the alternators or generators;

at least one carbon fiber tank for storing compressed air, wherein said at least one carbon fiber tank is coupled to said pneumatic motor to feed a supply of compressed air to said pneumatic motor when activated, thereby engaging with said plurality of alternators or generators and generating electrical energy for said electric motor and said at least one removable battery pack;

wherein said electric motor is a primary motor configured to propel a vehicle, and said second motor is a secondary motor configured to provide rotational energy to said plurality of alternators or generators, wherein at least one alternator or generator in said plurality of alternators or generators is configured to provide electrical power to said electrical motor;

wherein the vehicular power system is disposed at an underside of said vehicle; and said at least one rechargeable battery pack is installed in said lower storage compartment, wherein said lower storage compartment is located under a truck's flatbed and attached to said truck's chassis.

2. The vehicular power train system, as recited in claim 1, wherein the truck's is bordered by a front wall at a back of a cab of said truck, a tail gate-of said truck, and opposing fold-down side panels of said truck, wherein said battery in said lower storage compartment of said vehicle is accessible when a side panel directly above said lower storage compartment in said two opposing side panels is in a closed state thereby allowing access to said fold-down sealing protection cover.

3. The vehicular power train system, as recited in claim 1, further comprising:
   a compressed air system disposed on a trailer coupled to the vehicular power train system, wherein said compressed air system includes at least one carbon fiber tank for storing compressed air, and a connection pipe that couples said compressed air system to said pneumatic motor of said vehicular power train system.

4. The vehicular power train system, as recited in claim 1, wherein each removable battery pack includes a set of four foldable support legs that support each removable battery pack when outside a vehicle but fold when each said battery pack is inserted in to said lower storage compartment of said vehicle.

5. A vehicle, comprising:
   a pickup truck bed having a flatbed, tail gate, and two opposing fold-down side panels at each side of said pickup truck flatbed;
   a pair of free-standing rear posts at a rear end of said pickup truck flatbed, wherein each free-standing rear post in said pair of free-standing rear posts includes at least one tail light, a latching means for said tail gate, and a latching means for one side panel of said two opposing fold-down side panels of said pickup truck flatbed, whereby said latching means for said tail gate and said fold-down side panels of said two opposing fold-down side panels are independent from each other; and said pair of rear free-standing posts allow each fold-down side panel in said pair of opposing fold-down side panels to be folded down independently from one another and from said tail gate, wherein each fold-down side panel and said tailgate includes adjustable spring loaded hinges to allow for slow folding down and easy lifting, and at least one adjustable lock chain providing adjustable angulation and positioning of said two opposing fold-down side panels and tail gate;

at least two independent motors wherein a first motor in said at least two independent motors is an electric motor, and a second motor in said at least two independent motors is a pneumatic motor;

at least one removable battery pack, wherein each battery pack in said at least one removable battery pack is disposed in a lower storage compartment of a vehicle, wherein each storage compartment includes an internal cavity for housing said at least one removable battery pack and a fold-down sealing protection cover;

said at least one removable battery pack configured to provide electrical energy to the electric motor;

said lower storage compartment having a pair of electrical connection prongs complemental to each battery pack in said at least one removable battery pack, wherein each pair of electrical connection prongs includes a positive prong and a negative prong that engages with a female electrical engagement means on each battery in said at least one removable battery pack;

said pneumatic motor is coupled to a plurality of alternators or generators, wherein said plurality of alternators or generators generate electrical energy for said electric motor and said at least one removable battery pack when said pneumatic motor engages with each alternator or generator in said plurality of alternators or generators;

at least one carbon fiber tank for storing compressed air, wherein said at least one carbon fiber tank is coupled to said pneumatic motor to feed a supply of compressed air to said pneumatic motor when activated, thereby engaging with said plurality of alternators or generators and generating electrical energy for said electric motor and said at least one removable battery pack; and wherein said electric motor is a primary motor configured to propel said vehicle, and said second motor is a secondary motor configured to provide rotational energy to said plurality of alternators or generators, wherein at least one alternator or generator in said plurality of alternators or generators is configured to provide electrical power to said electrical motor.

* * * * *